2,227,826

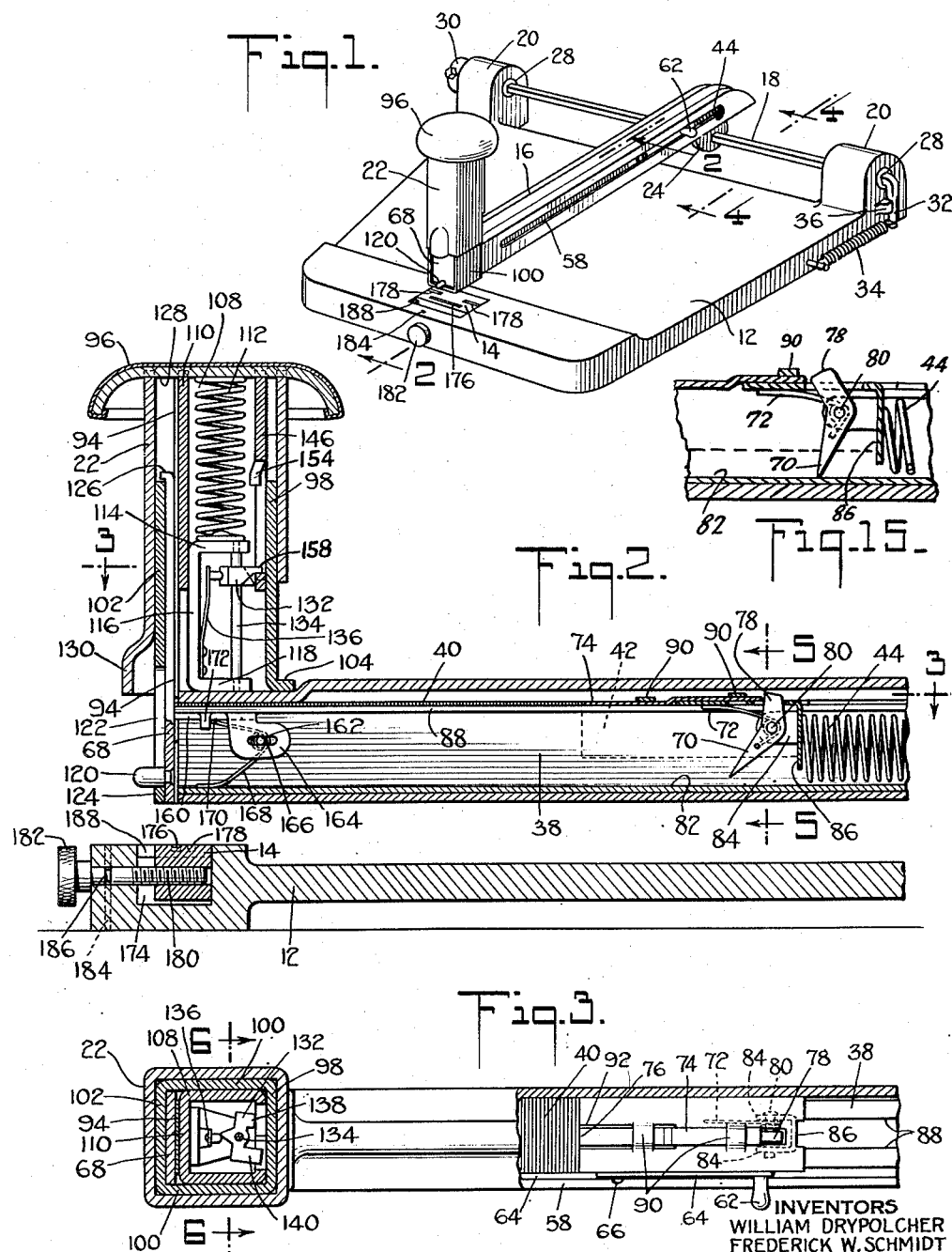

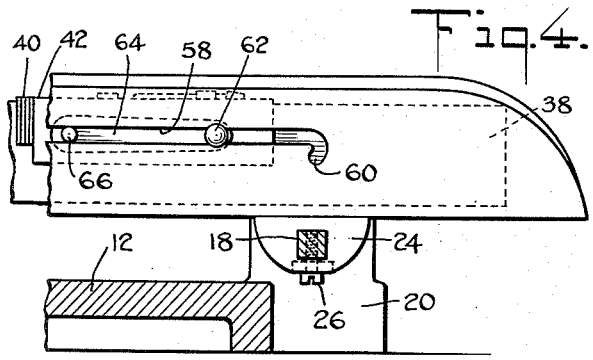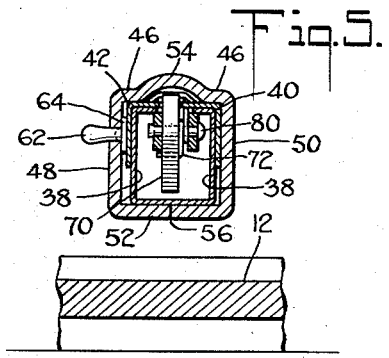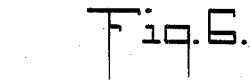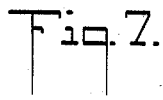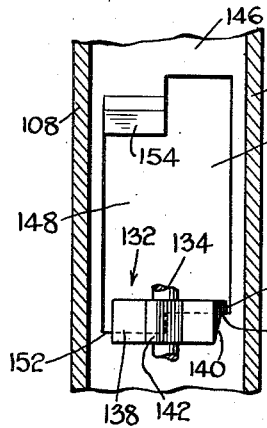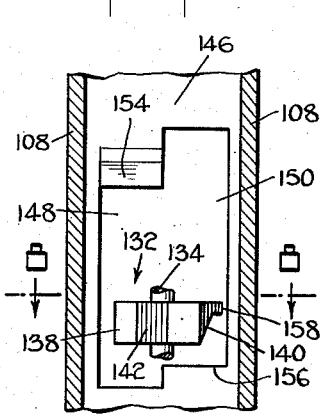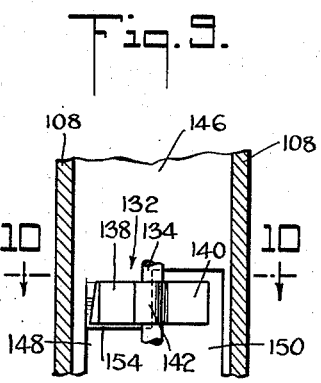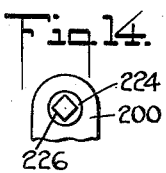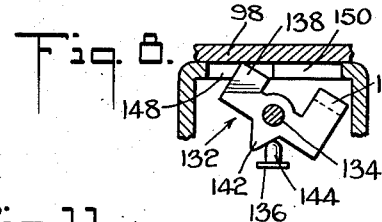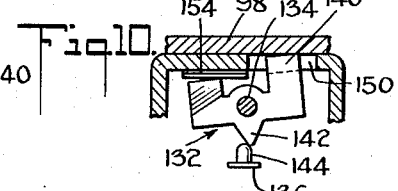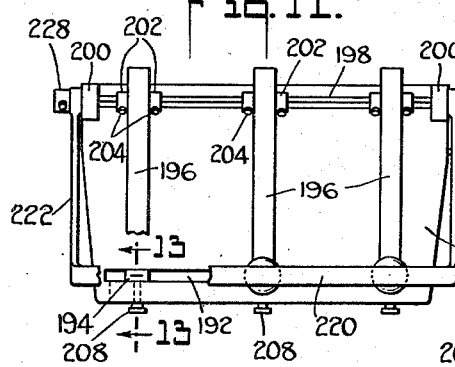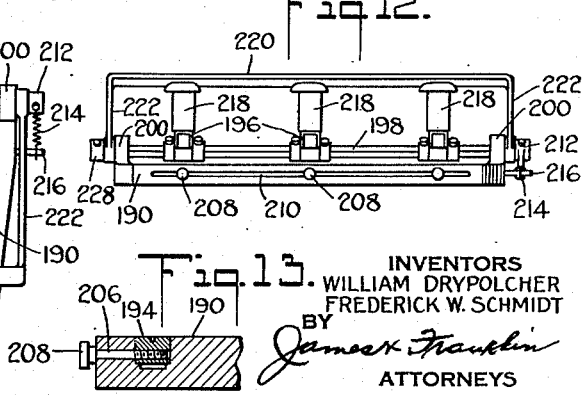
INVENTORS
WILLIAM DRYPOLCHER
FREDERICK W. SCHMIDT
BY
James K. Franklin
ATTORNEYS Patented Jan. 7, 1941

UNITED STATES PATENT OFFICE 2,227,826

STAPLING MACHINE

William Drypolcher, Valley Stream, and Frederick W. Schmidt, Brooklyn, N. Y., assignors to Lou Obstfeld, Brooklyn, N. Y., and Abraham Obstfeld, New York, N. Y.

Application October 12, 1936, Serial No. 105,197

25 Claims. (Cl. 1—3)

This invention relates to stapling machines, and more particularly to a single or multiple stapling machine arranged for unlimited stapling depth or reach.

The depth or reach of an ordinary stapling machine is definitely limited by the connection of the stapling arm to the base of the machine. So-called long-reach machines have been designed, but these differ from an ordinary stapling machine merely in lengthening the stapling arm from a few inches to a matter of, say, twenty inches at most. With these machines as with ordinary machines, the material inserted in the machine eventually strikes and is stopped by the connection of the stapling arm to the base at the rear of the machine. One primary object of the present invention resides in the provision of a stapling machine arranged for unlimited stapling depth or reach.

There are frequent occasions where a plurality of staples are to be driven at a fixed spacing. In accordance with a further object of our invention, we provide a plurality of stapling arms each of which may be substantially conventional in construction but all of which are mounted on a single base or frame provided with common operating means for simultaneous operation of the several stapling arms. An ancillary object of the invention is to arrange the machine for universal application to varied requirements, and to that end we so mount the stapling arms and the clinching anvils in the machine as to make the same relatively movable in order to adjust the spacing therebetween, and to also make the same completely detachable so that the number of stapling mechanisms may be reduced or increased as desired. Still another object of the invention is to combine all of the foregoing features, thereby providing a multiple stapling machine having unlimited stapling depth or reach.

Further objects of our invention center about the individual or unit stapling mechanisms.

One such object resides in the provision of a substantially completely enclosed staple magazine. The open magazines now used expose the staples to dirt, moisture, and foreign materials, which cause corrosion, rusting, or jamming of the staples. Our improved magazine is provided with top, side, and bottom walls and is therefore substantially completely enclosed. A staple pusher arm projects through a narrow slot in one wall of the magazine and functions not only to retract and lock the staple pusher but also to indicate whether the machine is fully loaded, and later whether it is nearly empty and therefore ready for re-loading.

The stapling mechanism is preferably arranged for front loading. This is most convenient not only when loading the machine but also in case of trouble or jamming at the staple driving channel. However, if the staple feed is not locked before the staple loading door is opened, the staple clip may be forcibly ejected and injure the operator. Another object of our invention is to overcome this disadvantage, and this we do by the provision of a safety pawl on the staple pusher, which pawl is automatically moved into locking engagement with the magazine wall whenever the reaction of the staple clip on the pusher is terminated, as it is when the staple loading door is opened.

In accordance with further features and objects of our invention, the staple loading door is made vertically slidable, resulting in a simple, convenient and inexpensive construction; the use of external hinges and springs, with attendant cost and detriment to smooth, neat appearance, is eliminated; the door and driving plunger are provided with cooperating parts to insure positive closing of the door when resuming stapling operation; the driving plunger is made hollow and surrounds the guide mechanism of the stapling machine, thus providing increased bearing surface and a neater and more finished appearance; the vertically slidable door previously referred to is also enclosed and housed by the plunger; and the restoring spring and the stroke control mechanism previously referred to are also protectively housed and concealed by the external plunger.

To the accomplishment of the foregoing and other objects which will hereinafter appear, our invention consists in the stapling machine elements and their relation one to the other, as are hereinafter more particularly described in the specification and sought to be defined in the claims. The specification is accompanied by drawings in which:

Fig. 1 is a perspective view of a single-arm stapling machine having unlimited stapling depth or reach;

Fig. 2 is a section taken in the plane of the line 2—2 of Fig. 1;

Fig. 3 is a horizontal section taken in the plane of the line 3—3 of Fig. 2;

Fig. 4 is a section taken in the plane of the line 4—4 of Fig. 1;

Fig. 5 is a section taken in the plane of the line 5—5 of Fig. 2;

Fig. 6 is explanatory of the stroke control mechanism, and is a section taken in the plane of the line 6—6 of Fig. 3, showing the plunger at the top of its stroke;

Fig. 7 is a section taken in the plane of the line 6—6 of Fig. 3, and shows the relation of the parts when the plunger has been depressed slightly, the tumbler having swung into position to prevent return of the plunger to topmost position;

Fig. 8 is a section taken in the plane of the line 8—8 of Fig. 7, and is explanatory of the action of the tumbler;

Fig. 9 is a section taken in the plane of the line 6—6 of Fig. 3, and shows the tumbler being cammed into release position at the bottom of the plunger stroke in order to permit subsequent return of the plunger to topmost position;

Fig. 10 is a section taken in the plane of the line 10—10 of Fig. 9, and illustrates the change in tumbler position;

Fig. 11 is a plan view of a multiple stapling machine characterized by unlimited stapling reach;

Fig. 12 is a front elevation thereof;

Fig. 13 is an enlarged section through the anvil, and is taken in the plane of the line 13—13 of Fig. 11;

Fig. 14 is explanatory of the main bearings employed in the machine of Figs. 11 and 12 for the pivot rod; and Fig. 15 is a fragmentary section similar to Fig. 2, but showing the locking position of the pawl 70.

Referring to the drawings and more particularly to Fig. 1, the stapling machine comprises a relatively wide base 12 having a clinching anvil 14 over which is mounted a stapling arm 16, said arm being supported by a rod 18 extending transversely of the stapling arm from one side edge of the base to the opposite side edge of the base. The base is provided with means, specifically the elevated bearings 20, for supporting the rod 18 above the base. Because of this elevated support, a sheet of material being stapled may be passed rearwardly between the stapling arm and the base for an unlimited distance. The arrangement may, for example, be used with long webs of material supplied from rolls, as well as with ordinary sheets of material. This unlimited stapling depth is obtained while using a comparatively short stapling arm and consequently the parts of the machine are adequate in stiffness or rigidity, and the stapling plunger 22 is held directly over the anvil 14. This is to be contrasted with a long-reach machine in which the increase in depth or reach is sought solely by tremendously lengthening the stapling arm.

The stapling arm 16 is preferably fixedly secured to support rod 18 in order to lock the parts together both rotationally and axially of the support rod. In the present case the support rod is made square in section and is received in mating square holes in ears 24 on staple arm 16. The parts are locked together by a screw 26, best shown in Fig. 4. The ends of square rod 18 are received in bushings 28 the external surfaces of which are cylindrical. Bushings 28 are rotatable in bearings 20. Rod 18 is supported against axial movement by a suitable collar 30. At one end rod 18 is provided with an arm 32 normally pulled by a spring 34 in such direction as to elevate stapling arm 16. The resulting movement of arm 32 and the consequent normal elevation of arm 16 is determined by a suitable stop 36. In the present case arm 32 has been formed by bending one end of rod 18 at right-angles to the rod, but it will be understood that a separate arm may be secured to the square end of the rod, if desired.

The stapling mechanism may be described in greater detail by referring to Figs. 2 through 10 of the drawings. Stapling arm 16 is employed as a staple magazine. The magazine includes a staple core 38 on which a clip of staples 40 is slidable. The staples are normally fed toward the forward or driving end of the staple arm by a staple pusher 42 slidable behind the staple clip on staple core 38. The staple pusher is itself moved by a feed spring 44 (Fig. 2) housed within staple core 38. The staple magazine is substantially fully enclosed by a housing which may be formed by the magazine arm itself. More specifically and as is best shown in Fig. 5, the housing comprises a top wall 46, side walls 48 and 50, and a bottom wall 52. The center portion of the top wall is preferably convexed or ridged, as is indicated at 54. The housing is made by suitably bending a single piece of heavy-gauge sheet metal, the longitudinal edges of the metal being brought together at the bottom, as indicated at 56. Top wall 46 and side wall 50 are disposed close to the staple core 38 and together therewith form a staple feed channel. Bottom wall 52 is directly in contact with the bottom wall of the staple core, and the core and housing are secured directly together at their bottom walls. This may be done by spot-welding or other suitable means.

Side wall 48 is preferably provided with a slot 58 extending longitudinally thereof, as is best shown in Figs. 1 and 4. The rear end of slot 58 is turned sidewardly or notched at 60. The staple pusher 42 is provided with a finger or handle 62 which projects sidewardly through slot 58. It is thus readily possible to pull the staple pusher rearwardly in order to relieve its pressure on the staples during re-loading. At the same time the handle 62 serves as an indication of the amount of staples left in the machine at any time. Inasmuch as it is convenient to be able to lock the staple pusher in retracted position, the handle 62 is mounted at one end of a preferably thin strip 64 (Figs. 3, 4, and 5) the opposite end of which is pivotally mounted on the side of the staple pusher at 66. With this arrangement, handle 62 is readily pushed into notch 60 when the staple pusher is retracted, thereby locking the same in position. Inasmuch as the normal pressure on finger 62 when handled in the ordinary manner includes a downward component, the finger is practically automatically locked in notch 60 whenever the staple pusher is drawn back to the end of slot 64.

The machine is provided for front loading by means of a vertically slidable loading door 68. To prevent sudden undesired ejection of staple clip 40 on opening of the door 68, we provide a safety pawl 70 (Figs. 2 and 5) mounted on staple pusher 42. Pawl 70 is normally urged in a counter-clockwise direction, as viewed in Fig. 2, by a spring 72. However, the pawl is normally prevented from moving under the influence of spring 72 by a longitudinally slidable feeler 74, best shown in Figs. 2 and 3. The forward end of the feeler bears against the rearmost staple at 76, and the reaction of the staple clip on feeler 74 causes the rear end of the feeler to bear against an arm 78 (Fig. 2) projecting upwardly from pawl 70 above the pawl pivot 80. With this arrangement, it will be evident that under normal operation the parts assume the relation shown in Fig. 2, at which time pawl 70 is clear of the adjacent magazine wall or, more specifically, the bottom wall 82 of the staple core. If, however, the staple loading door 68 is opened, the staple clip may begin to move outwardly and no longer exerts its normal reaction on feeler 74. Pawl 70 thereupon moves downwardly under the influence of spring 72, and engages the bottom wall 82 of the staple core, as shown in Fig. 15. At this time the pawl is nearly but not quite vertical and therefore automatically locks itself in position.

Considering the constructional details of this mechanism, it may be mentioned that the bearing pin 80 of pawl 70 passes through ears 84 bent forwardly from a vertical wall 86 which in turn is bent downwardly from the top wall of the staple pusher. Wall 86 functions to take the pressure of feed spring 44. Wall 86 may be bent downwardly into the staple core, and pawl arm 78 may project upwardly through the staple core because the staple core is slotted rather than completely closed at the top. Thus, reverting to Fig. 5, it may be remarked that while the outer wall of the magazine or housing is formed by bending the metal downwardly and inwardly to the point 56, the staple core is formed by bending sheet metal upwardly and inwardly, with a space left between the inturned edges, this space extending the entire length of the staple core and constituting the aforementioned slot which is clearly shown at 88 in Figs. 2 and 3. Feeler 74 is guided by straps 90 struck upwardly from the top surface of pusher 42, and the latter is cut away near its forward end, as indicated at 92 in Fig. 3, so that the forward part of feeler 74 may be placed flush with the top of pusher 42, as is best shown in Fig. 2, thus bringing the forward end of feeler 74 directly in back of the staple clip even when using comparatively slender staples.

Referring to Figs. 2 and 3, the staple driving blade 94 is secured to and moved by a staple driving plunger 22 surmounted by an operating knob 96. Plunger 22 is hollow and is disposed outside rather than inside the fixed guide walls 98, 100, and 102 of the mechanism. These walls are all secured to the forward end of the magazine arm. More specifically, wall 98 is bent rearwardly to form a flange 104 which is secured to the top wall 46 at the forward end of the magazine. The side walls 100 are secured outside the side walls of the magazine. The front wall 102 is formed integrally with and is supported by side walls 100.

In the specific arrangement here illustrated, the plunger is double-walled, it having a set of walls 108 disposed just inside of fixed guide walls 98 and 100. The forward side 110 carries the staple driving blade 94 which in turn slides just inside of door 68, and the latter is disposed just within forward fixed wall 102 previously referred to. The plunger is normally elevated by a compression spring 112 disposed within the plunger between knob 96 and the upper end 114 of a bracket 116 the lower end 118 of which is secured to the forward end of the staple magazine. Bracket 116 is employed primarily to provide room beneath spring 112 for staple control mechanism subsequently described. It will be perceived, however, that with this arrangement the restoring spring 112 and the staple control mechanism are completely protectively housed and concealed by the plunger, and that the external wall of the plunger surrounds all of the working parts, thus giving the machine a smooth and neat appearance indicated to some extent in Fig. 1.

Door 68 is located accurately in position by fixed side walls 100 and front wall 102, together with the staple driving blade 94. Accurate location of door 68 is, of course, desirable because it acts as one side of the staple drive channel formed at the forward end of the staple core. The door may be slid upwardly by means of a handle 120 projecting forwardly therefrom. Fixed front wall 102 is cut away at 122 (Fig. 2) not only to clear handle 120 but also to clear the entire end of the staple core, thereby permitting loading or removal of the staple clip, as well as clearing of a staple jammed in the staple feed channel. Front wall 102 is, however, preferably left intact at its lower edge 124 (Fig. 2), thereby forming a tie or reinforcement which strengthens door 68 against outward movement when the door has been lowered to closed position. At the same time the tie 124 acts as a stop to limit the downward movement of the door.

In order to insure positive closing of door 68 upon resumption of stapling operation, the upper end of the door is extended upwardly to form a projection 126 disposed in the path of any suitable part of the driving plunger, in this case the lower surface of knob 96 at the point 128. Projection 126 is so dimensioned that when the plunger is depressed to bottommost position, surface 128 just reaches projection 126 if the door is in lowered or closed position. However, if the door has been left partially or wholly open, the plunger knob itself bears against projection 126 and closes the door. In passing, it may be noted that the forward wall of plunger 22 is convexed at 130 to clear knob 120, this being done where, as is here the case, the outside walls of the plunger are so dimensioned as to reach the bottom of the magazine arm when the plunger is fully depressed.

It has already been mentioned that stroke control mechanism is located in bracket 116, this stroke control mechanism functioning to prevent complete upward movement of the plunger unless the preceding downward stroke has been completed. Referring to Figs. 2 and 3, the mechanism comprises a tumbler 132 oscillatable about spindle 134 and normally moved to one extreme position or the other by resilient means 136. Referring now to Figs. 6 through 10 of the drawings, it may be explained that tumbler 132 includes a detent 138, a restoring cam 140, and a wedge-shaped cam 142. These all move together and are preferably formed integrally. Finger 144 (Figs. 8 and 10) pushed against wedge cam 142 by leaf spring 136, functions to make the tumbler unstable at dead-center and to urge the same to either side of dead-center toward one extreme position or the other.

The rear wall 146 of the internal plunger sleeve is provided with longitudinally displaced slots 148 and 150. In the particular example here shown the overlapping parts are contiguous, and there results a single large slot with stepped ends, but it is more convenient, for purposes of description of operation, to think of the two component slots. Slot 148 may be referred to as a detent slot, and slot 150 as a restoring slot. The lower edge 152 of slot 148 is disposed slightly higher than the bottom of detent 138 when the plunger is in elevated position, as shown in Fig. 6. At this time the finger 144 tends to move the tumbler clockwise, as viewed in Fig. 8, although the tumbler is unable to move in a clockwise direction as far as is indicated in Fig. 8 because detent 138 bears against the inner surface of wall 146. The relation of the parts at this time may be seen by reverting for the moment to Fig. 3. The detent 138 is operative in the sense that it is resiliently urged toward locking position and is ready to function as soon as the plunger is depressed a slight amount. When the plunger is depressed slightly, detent 138 moves into slot 148, and the parts then assume the relation clearly shown in Fig. 8. It is then impossible for the plunger to again rise to its elevated position, for on attempting to do so the bottom edge 152 of detent slot 148 bears against the bottom of detent 138. During downward movement of the plunger the parts assume the relationship shown in Figs. 7 and 8. On continued downward movement, the upper end 154 of slot 148 reaches and bears against the sloping upper surface of detent 138. The part 154 is bent inwardly, as is best shown in Fig. 10, and functions to oscillate tumbler 132 in a counter-clockwise direction past dead-center, that is, to a point where finger 144 bears against the opposite side of wedge 142, as is shown in Fig. 10. It will be noted that the upper edge 154 of slot 148 is bent inwardly in order to cam the detent outwardly an amount further than that indicated in Fig. 3, this being necessary if the tumbler is to be moved to the other side of dead-center. This upper edge 154 is, of course, so located in elevation that the change of tumbler position takes place at or near the end of the downward stroke of the plunger. The plunger is shown in lowermost position in Figs. 9 and 10. The restoring cam 140 of the tumbler is received in slot 150 and there remains during the upward movement of the plunger. At this time the detent is inoperative, it being made so because the tumbler is resiliently urged away from rather than toward the detent slot. There is accordingly no interference with upward movement of the plunger. Near the end of the upward movement, the lower edge 156 of restoring slot 150 bears against the sloping bottom surface of restoring cam 140, thus turning the tumbler in a clockwise direction past dead-center, that is, until finger 144 bears against the right-hand side of wedge 142. The top part of camming member 140 is preferably prolonged, as indicated at 158, in order to form a positive stop limiting the permissible upward movement of the plunger. The tumbler is now in such position as to make detent 138 operative, that is, it bears resiliently against the inner surface of wall 146 and is ready to spring into slot 148 the moment the plunger is partially depressed. The parts are again in the position shown in Figs. 3 and 6.

It should be understood that it is not essential to have slots 148 and 150 cut through the plunger wall 146. This is merely a convenient way to obtain operating surfaces 152, 154, and 156. It is entirely feasible to provide lugs mounted within or projecting inwardly from the plunger wall 146, said lugs being so located as to correspond precisely in function with the surfaces 152, 154, and 156 here constituting the ends of slots.

Reverting to Fig. 2, the staple being driven is normally held upwardly by a retractor tongue 160 pivoted within the staple core on a pin 162. The side ears 164 of tongue 160 are preferably slotted at 166 to receive pin 162. Spring 168 functions to urge tongue 160 in a clockwise direction, that is, upwardly against the staple. The upper end 170 of spring 168 is bent sidewardly and moves against a lug 172 depending from tongue 160. The spring thus functions not only to urge tongue 160 upwardly but also to urge the same forwardly, that is, toward door 68. The advantage of using slots 166 rather than perforations, resides in the fact that the possibility of excessive frictional restraint on the staple driving blade 94 is eliminated. This is particularly desirable during upward movement of the blade, for with the present construction the tongue readily moves rearwardly out of the way of the blade and cannot function as a locking pawl which might otherwise wedge itself against the blade.

The legs of the staple are bent on a suitable anvil 14 previously referred to. The base 12 is recessed at 174 to receive anvil block 14. The anvil is arranged to bend the legs of the staple in several ways, specifically to bend the legs toward one another for permanent stapling, and, alternatively, to bend the legs away from one another for temporary fastening. The permanent clinching is obtained by a slot 176, while the temporary fastening is obtained by a pair of separated slots 178. Slot 176 is brought beneath the staple driving blade 94 when anvil 14 is moved rearwardly within recess 174, as shown in Figs. 1 and 2. Slots 178 are brought beneath the staple driving blade when the anvil is moved forwardly in recess 174. To control the movement of anvil 14, we provide a screw 180 turned by a knurled head 182. The screw is locked against axial movement by means of a pin 184 received in a circumferential groove 186 on the shank of screw 180. The screw is threadedly received in anvil 14 and when rotated functions to move the anvil axially of the screw, that is, forwardly or rearwardly of the base. By turning the screw as far as possible in one direction or the other, the anvil is moved and locked in proper position. The thread of the screw is preferably made fine, thus eliminating any possibility of accidental loosening or movement of the anvil. The anvil is supported against downward movement in any desired fashion, this being done in the present case by forming seats or rails 188 at the ends of recess 174, and anvil 14 is itself provided with outwardly projecting ends which overlie the seats or rails 188. It should be noted that the parts are so disposed that the top surface of anvil 14 is flush with the top surface of the base, thus facilitating the sliding of sheets into and out of the machine.

The stapling machine illustrated in Fig. 1 is readily modified for multiple operation, that is, for simultaneously applying a plurality of staples through sheets or webs of material. Referring to Figs. 11 and 12, such a machine comprises a base 190 provided with a channel 192 extending from side to side near the forward edge of the base. This channel receives a plurality of clinching anvils 194, there being one anvil, of course, for each stapling arm. A plurality of stapling arms 196 are mounted on a rod 198 extending transversely of the stapling arms. Said rod is carried in bearings or supports 200, and these are preferably elevated in order to make the machine unlimited in stapling depth or reach. Rod 198 is preferably non-circular in cross-section, it being square in the present case.

The stapling arms 196 may each be like that previously described, except for the fact that the arms are provided with enlarged collars 202 having set screws 204. By loosening the set screws the arms may be adjusted from side to side in order to vary the spacing between the staples. At the same time the anvils 194 are commensurately moved from side to side. To lock the anvils in place, each anvil block 194 is provided with a screw 206 (Fig. 13) having a head 208. Screws 206 are sidewardly movable in a slot 210, best shown in Fig. 12. It will be understood that by loosening screw 206 the anvil may be moved sidewardly until it is in desired position, whereupon screw 206 may again be tightened. It will be noted that the upper surface of the anvil is flush with the top of the base.

The stapling arms 196 are normally moved upwardly to elevated position by means of an arm 212 secured to one end of rod 198 and having its lower end drawn forwardly by a spring 214 tensioned between arm 212 and a pin 216 projecting from the side of base 190. Spring 214 thus forms a common means for elevating all of the magazine arms. The plungers 218 are individually elevated relative to the magazine arms by the springs carried therewithin. In order to simultaneously operate the plungers, we provide a common operating bar 220 overlying plungers 218 and movably mounted so that upon depression of bar 220 the stapling arms and plungers are all simultaneously depressed. A convenient way to movably mount bar 220 is to provide the same with rearwardly extending arms 222 the ends of which are oscillatable about an axis near or the same as the axis of rod 198. In the present case bar 220 and arms 222 are formed integrally, and arms 222 are freely oscillatable about rod 198. Rod 198 is, of course, oscillatable in bearings 200. In order to provide an improved bearing surface while using a rod of simple square section, the bearings 200 may be provided with cylindrical bushings 224, best shown in Fig. 14. Bushings 224 are rotatable in bearings 200, and rod 198 is received within bushing 224, as by providing the same with a square hole 226.

The rear ends of arms 222 may also be provided with bushings of this character. Rod 198 is held against axial movement by a removable collar 228 at one end and the preferably removable arm 212 at the opposite end. An advantage of this construction is that the number of stapling arms used in the machine may be varied, it being readily possible to remove or replace some of the arms by removing collar 228, loosening screws 204, and thereupon sliding rod 198 axially through the stapling arms. At the same time the number of anvils 194 is similarly changed, this being done by first completely removing screw 206, whereupon the anvil is readily lifted upwardly out of groove 192.

It is believed that the construction and operation as well as the many advantages of our improved stapling machine, will be apparent from the foregoing detailed description thereof. The machine is characterized by unlimited stapling depth or reach, yet the magazine arms are short and sturdy and may be held in accurate alignment with the clinching anvils. Multiple stapling operations may be simultaneously performed, and the spacing of the staples as well as the number of staples may be varied as desired. The multiple machine may be converted to a single-arm machine by simply removing the extra stapling arms. The individual stapling mechanisms are improved in character, being provided with enclosed stroke control means; an enclosed staple magazine; an improved safety stop for the staple clip; an improved slidable door for front loading of the machine; mechanism responsive to downward movement of the plunger to insure closing of the door; and an external plunger sleeve which surrounds and conceals all of the mechanism in the driving head of the machine; as well as a staple retractor tongue which cannot bind or jam the staple driving blade.

It will be apparent that while we have shown and described our invention in preferred forms, many changes and modifications may be made in the structures disclosed without departing from the spirit of the invention, defined in the following claims.

We claim:

1. A stapling machine comprising a wide base, a clinching anvil on said base, a stapling arm over said base and anvil, a long support rod extending transversely of said stapling arm from one side of the base to the opposite side of the base for pivotally supporting said arm above the base, and widely spaced means at the sides of said base for supporting said rod above the base near the ends of the rod, said rod being very much longer than the combined width of the stapling arm and support means, and the space between said base and rod being clear of obstructions, whereby material being stapled may be passed in the direction of the stapling arm to an unlimited extent.

2. A manually operable stapling machine of the desk type comprising a wide base, a clinching anvil on said base, a vertically oscillatable stapling arm over said base and anvil, said arm being of generally conventional type and including a staple magazine, a support rod extending transversely of said stapling arm from one side of the base to the opposite side of the base, means fixedly securing said stapling arm against axial and rotative movement on the rod, elevated bearings at the sides of the base for said rod, and resilient means connected to said rod for so oscillating the rod as to elevate the stapling arm.

3. A manually operable multiple stapling machine of the desk type, said machine comprising a wide base, a plurality of clinching anvils on said base, a plurality of stapling arms over said base and anvils, each of said arms being of the general type conventionally used in desk type stapling machines, and each including a staple magazine, and a staple driving plunger, a support extending transversely of said stapling arms from one side of the base to the opposite side of the base, bearings at the sides of the base for said support, and a common operating means for simultaneously operating the stapling arms.

4. A multiple stapling machine comprising a wide base, a plurality of clinching anvils on said base near the forward edge thereof, a plurality of vertically oscillatable stapling arms over said base and anvils, each of said arms being of the general type conventionally used in desk type stapling machines, and each including a staple magazine and a staple driving plunger, a support rod extending transversely of said stapling arms from one side of the base to the opposite side of the base, means fixedly securing said stapling arms against axial and rotative movement on the rod, bearings at the sides of said base for said rod, resilient means connected to said rod for so oscillating the rod as to elevate the stapling arms, and a common operating means for simultaneously depressing the stapling arms.

5. A manually operated multiple stapling machine comprising a wide horizontal base, a plurality of clinching anvils on said base, a plurality of approximately horizontal stapling arms pivotally mounted on said base over said anvils, resilient means normally elevating the arms above the anvils, each of said stapling arms being of the general type conventionally used in desk type stapling machines, and each including a staple magazine for a stick of ready-made staples and a staple driving plunger, the staples and plunger being arranged transversely of the magazine and stapling arm, and a common manually depressible operating means disposed over the plungers and the stapling arms.

6. A multiple stapling machine comprising a wide base, a plurality of clinching anvils on said base, a plurality of stapling arms mounted on said base over said anvils, each of said stapling arms including a staple magazine and a staple driving plunger, a common pivot bar for all of said stapling arms, resilient means connected to said common pivot bar for normally elevating the stapling arms, resilient means for normally elevating the plungers relative to the stapling arms, and a common operating bar movably mounted for simultaneous depression of the plungers.

7. A multiple stapling machine comprising a wide base, a plurality of clinching anvils disposed on said base, said anvils being independently movable from side to side on the base and being removable from the base, a plurality of stapling arms disposed over the anvils, a rod extending transversely of the stapling arms from one side edge to the opposite side edge of the base, releasable means for fixedly locking each of the stapling arms to the rod at any desired point along the rod and for permitting removal or addition of stapling arms, elevated bearings at the side edges of the base rotatably receiving the rod, each of said stapling arms including a staple magazine and a staple driving plunger, and common operating means for all of said arms and plungers.

8. A multiple stapling machine comprising a wide base, a plurality of clinching anvils disposed on said base, said anvils being independently movable from side to side on the base and being removable from the base, a plurality of stapling arms disposed over the anvils, a rod extending transversely of the stapling arms from one side to the opposite side of the base, means for fixedly locking each of the stapling arms to the rod at any desired point along the rod, elevated bearings at the sides of the base receiving the rod, resilient means for normally oscillating the rod in such direction as to elevate the stapling arms, said rod being slidable through said bearings to permit the removal or addition of stapling arms, each of said stapling arms including a staple magazine and a staple driving plunger, resilient means for normally elevating the plungers relative to the stapling arms, and a common operating bar disposed over all of the plungers, said bar being movable for simultaneous depression of the plungers.

9. A multiple stapling machine comprising a wide base, a channel in said base extending from side to side, a plurality of clinching anvils disposed in said channel with their tops flush with the top of the base, said anvils being independently movable from side to side in the channel, a plurality of stapling arms disposed over the anvils, a common pivot bar for all of said stapling arms, means affording side to side adjustment of the stapling arms on said pivot bar, said stapling arms and anvils being sidewardly adjustable to vary the spacing between staples, resilient means for normally elevating all of the stapling arms, each of said stapling arms including a staple magazine and a staple driving plunger, and means for simultaneously operating said stapling arms and plunger.

10. A stapling machine comprising a hollow sheet metal staple core formed by bending a piece of sheet metal upwardly and then inwardly, a staple pusher slidable on said core and having a part passing into said core between the inwardly bent edges, a feed spring in said core bearing against said part, and a magazine arm surrounding and fully enclosing the staple core and staple pusher, the arm being made of a single plate of metal bent downwardly and then inwardly to form a bottom, the bottom of the staple core being secured to the bottom of the arm, and one or more walls of said arm being disposed so close to the core as to form therewith a staple feed channel, one side wall of the housing being longitudinally slotted, and a finger-piece projecting from said staple pusher through said slot for retraction of the staple pusher, and a locking recess near the rear end of the slot for holding the staple pusher in retracted position.

11. A stapling machine comprising a staple magazine including a door for front loading, a staple core, a staple pusher slidable on said core, resilient means normally urging the staple pusher toward the door, means to lock the staple pusher in retracted position, and a safety stop to prevent forcible ejection of a staple clip should the door be opened without locking the staple pusher, said safety stop including a pawl pivoted on and movable with the pusher, said pawl upon opening of the door being movable into engagement with a stationary wall to arrest undesired movement of the pusher.

12. A stapling machine comprising a staple magazine including a door for front loading, a staple core, a staple pusher slidable on said core, resilient means normally urging the staple pusher toward the door, means to move the staple pusher to retracted position, and a safety stop to prevent forcible ejection of a staple clip should the door be opened without retracting the staple pusher, said safety stop including lock means on the pusher, and a feeler finger on said pusher bearing against the staple clip and moving the lock means to normally released position, and means whereby the lock means is automatically made operative upon release of the reaction of the staple clip against the feeler finger.

13. A stapling machine comprising a staple magazine, a staple core, a staple pusher slidable on said core, resilient means normally urging the staple pusher to move, and a safety stop to prevent such movement, said safety stop including a pawl pivoted on the pusher and movable into locking engagement with a stationary wall to arrest movement of the pusher, means on said pusher bearing against the staple clip and cooperating with said pawl to move said pawl into locking engagement upon release of reaction of the staple clip against said means.

14. A stapling machine comprising a staple magazine including a door for front loading, a staple core, a staple pusher slidable on said core, resilient means normally urging the staple pusher toward the door, means to lock the staple pusher in retracted position, and a safety stop to prevent forcible ejection of a staple clip should the door be opened without locking the staple pusher, said safety stop including a pawl pivoted on the pusher, resilient means normally tending to move the pawl into engagement with a wall of the magazine to arrest forward movement of the pusher, and a feeler on said pusher bearing against the staple clip and moving the pawl against the pawl spring to released position.

15. A stapling machine comprising a staple magazine, a staple driving plunger at the forward end of said magazine, a vertically slidable door at the forward end of said magazine for front loading, and means at the forward end of said magazine for guiding the plunger, said plunger being hollow and having walls surrounding the aforesaid guide means and slidable door.

16. A stapling machine comprising a stapling arm, a staple driving plunger, hollow guide means at the forward end of said stapling arm for guiding said plunger, said plunger being hollow and having walls which surround the guide means, said guide means being hollow, a restoring spring within the guide means for normally elevating the plunger, and stroke control mechanism within the guide means for preventing upward movement of the plunger until its downward stroke has been completed.

17. A stapling machine comprising a stapling arm, a staple driving plunger, hollow guide means at the forward end of said stapling arm for guiding said plunger, said plunger being hollow and having double walls which surround the walls of the guide means both inside and outside, a restoring spring within the plunger for normally elevating the plunger, and stroke control mechanism within the plunger for preventing upward movement of the plunger until its downward stroke has been completed.

18. In a stapling machine, a base, a stapling arm over said base, a clinching anvil in said base beneath said stapling arm, said anvil comprising a plurality of alternatively usable slots for bending the staple legs in different ways, means for moving and holding the anvil in proper position relative to the base in order to make one or another of the slots operative, said means including a screw connected to the anvil and extending in the direction of movement of the anvil and rotatably mounted in order to move said anvil in response to and under control of the threads of said screw.

19. In a stapling machine, a base, a stapling arm over said base, a clinching anvil in said base beneath said stapling arm, said anvil comprising a plurality of alternatively usable slots for bending the staple legs in different ways, and means for moving and holding the anvil in proper position relative to the base in order to make one or another of the slots operative, said means including a screw connected to the anvil and extending in the direction of movement of the anvil and rotatably mounted in order to move said anvil in response to and under control of the threads of said screw, said base being recessed to receive said anvil, and the upper surface of said anvil being flush with the upper surface of the base.

20. A stapling machine comprising a stapling arm, a staple driving plunger, hollow guide means at the forward end of said stapling arm for guiding said plunger, said plunger having double walls which surround the walls of the guide means both inside and outside.

21. A stapling machine comprising a staple magazine, a staple driving plunger at the forward end of said magazine, guide walls at the forward end of said magazine for guiding the plunger, said plunger being hollow and having externally exposed walls surrounding the aforesaid guide means.

22. A stapling machine comprising a base, a clinching anvil on said base, stapling mechanism including a staple magazine and a staple driving plunger, means to movably support the stapling mechanism over the base, said support means extending sidewardly or transversely of said staple magazine and being pivotally secured to the base at a point remote from the anvil and stapling mechanism, and resilient means acting directly on the pivoted support means at a point still more remote from the stapling mechanism for normally elevating the stapling mechanism, whereby the resilient means does not interfere with insertion of material between the base and the stapling mechanism.

23. A stapling machine comprising a staple magazine, a staple driving plunger at the forward end of said magazine, a knob on the top of said plunger, a vertically slidable door at the forward end of said magazine for front loading, said door remaining frictionally in open position when opened, and thereby facilitating the staple loading operation, and means to insure complete closing of the door, said means including a part extending upwardly on the door and so disposed in the path of the knob on the staple driving plunger that depression of the knob forces the door downwardly to fully closed position unless the door has already been fully closed.

24. A stapling machine comprising a staple magazine, a staple driving plunger at the forward end of said magazine, a vertically slidable door at the forward end of said magazine for front loading, means at the forward end of said magazine for guiding the plunger, said plunger being hollow and having walls surrounding the aforesaid guide means and slidable door, and means to insure complete closing of the door, said means including a part extending upwardly on the door and so disposed in the path of a part on the staple-driving plunger that depression of the plunger forces the door downwardly to fully closed position unless the door has already been fully closed.

25. A stapling machine comprising a staple magazine including a door for front loading, a staple core, a staple pusher slidable on said core, resilient means normally urging the staple pusher toward the door, locking means mounted on and movable with the staple pusher to completely stop forward movement of said staple pusher and to thereby prevent said staples from flying out of the magazine when the door is opened, said means being effective at any point throughout the staple feeding range of the staple pusher when the door is opened, but being ineffective when the door is closed.

WILLIAM DRYPOLCHER.
FREDERICK W. SCHMIDT.